United States Patent
Boss et al.

(10) Patent No.: US 11,295,401 B2
(45) Date of Patent: Apr. 5, 2022

(54) PREDICTIVE HOTEL ARRIVAL USING KEYLESS ENTRY SYSTEMS

(71) Applicant: International Business Machines Corporation, Armonk, NY (US)

(72) Inventors: Gregory J. Boss, Saginaw, MI (US); James E. Bostick, Cedar Park, TX (US); John M. Ganci, Jr., Cary, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 15/420,142

(22) Filed: Jan. 31, 2017

(65) Prior Publication Data

US 2018/0218460 A1 Aug. 2, 2018

(51) Int. Cl.
*G06Q 50/12* (2012.01)
*G06Q 10/10* (2012.01)
*G06N 5/02* (2006.01)
*G07C 9/00* (2020.01)

(52) U.S. Cl.
CPC .......... *G06Q 50/12* (2013.01); *G06N 5/022* (2013.01); *G06Q 10/1097* (2013.01); *G07C 9/00904* (2013.01)

(58) Field of Classification Search
CPC combination set(s) only.
See application file for complete search history.

(56) References Cited

U.S. PATENT DOCUMENTS

| 6,897,767 | B2 | 5/2005 | Kim |
| 7,474,210 | B2 | 1/2009 | Roberts et al. |
| 2004/0160305 | A1* | 8/2004 | Remenih ............ G07C 9/00103 340/5.22 |
| 2010/0191551 | A1 | 7/2010 | Drance et al. |
| 2013/0102283 | A1* | 4/2013 | Lau ....................... H04W 12/06 455/411 |

(Continued)

FOREIGN PATENT DOCUMENTS

| AU | 2015101271 A4 * | 10/2015 |
| CN | 105006051 A | 10/2015 |

(Continued)

OTHER PUBLICATIONS

Souse, P.J., et al. "Wireless control and network management of door locks," 2015 3rd Experiment International Conference (exp. at'15), 2015, pp. 141-142 [online], [retrieved on Jan. 10, 2022], Retrieved from the Internet <https://ieeexplore.ieee.org/document/7463244?source=IQplus> (Year: 2015).*

(Continued)

*Primary Examiner* — Jerry O'Connor
*Assistant Examiner* — Michael R Koester
(74) *Attorney, Agent, or Firm* — Yee & Associates, P.C.

(57) ABSTRACT

A method, system, and computer program product for predicting a hotel room arrival for a guest at a hotel. The method comprises a hotel computer system receiving calendar information for the guest from a mobile device for the guest of the hotel while the guest is in the hotel. The method predicts the hotel room arrival for the guest at the hotel using the calendar information. The method performs an action in the hotel based on the hotel room arrival predicted for the guest.

20 Claims, 7 Drawing Sheets

(56) References Cited

U.S. PATENT DOCUMENTS

| | | | |
|---|---|---|---|
| 2015/0073980 A1* | 3/2015 | Griffin | H04W 12/04031 |
| | | | 705/39 |
| 2015/0324332 A1* | 11/2015 | Perret | H04W 4/70 |
| | | | 715/234 |
| 2015/0348049 A1 | 12/2015 | Todasco et al. | |
| 2016/0044472 A1 | 2/2016 | Person | |
| 2016/0217397 A1 | 7/2016 | Peters et al. | |
| 2016/0300411 A1* | 10/2016 | Isaacson | G07C 9/00103 |
| 2017/0115018 A1* | 4/2017 | Mintz | F24F 11/30 |
| 2017/0116561 A1* | 4/2017 | Saddler | G06Q 10/063116 |

FOREIGN PATENT DOCUMENTS

| | | |
|---|---|---|
| CN | 205068526 U | 3/2016 |
| WO | WO2015183388 A1 | 12/2015 |

OTHER PUBLICATIONS

Basili, A., et al. "NFC Smart Tourist Card: Combining Mobile and Contactless Technologies towards a Smart Tourist Experience," 2014 IEEE 23rd International WETICE Conference, 2014, pp. 249-254 [online], [retrieved on Jan. 10, 2022], Retrieved from Internet <<https://ieeexplore.ieee.org/document/6927059 (Year: 2014).*

* cited by examiner

PREDICTIVE HOTEL ARRIVAL USING KEYLESS ENTRY SYSTEMS

BACKGROUND

1. Field

The disclosure relates generally to an improved computer system and, more specifically, to a method and apparatus for predicting an arrival of a guest at a hotel room. Still more particularly, the present disclosure relates to a method and apparatus for predicting the arrival of a guest at a hotel room using a keyless entry system.

2. Description of the Related Art

Some hotels employ a keyless entry system for entering hotel rooms. These hotels may allow a guest to unlock a door to their hotel room using a mobile application on their device. These types of systems often use a near or medium field communication technology to communicate with door locks or receivers in other locations in the hotel.

For example, a digital hotel key mobile application may send a token to a receiver on a hotel door. This token is sent in encrypted form to a central server for a hotel system for authentication and authorization. The token is sent over a near field communication technology or a Bluetooth signal. The hotel room door is unlocked using the token in an authentication and authorization process.

SUMMARY

An embodiment of the present disclosure provides a method, system, and computer program product for predicting a hotel room arrival using keyless entry. The method provides for a hotel computer system that receives calendar information for a guest from a mobile device for the guest of a hotel while the guest is in the hotel. The hotel computer system predicts the hotel room arrival for the guest at the hotel room using the calendar information and performs an action in the hotel based on the hotel room arrival predicted for the guest. A hotel computer system provides a processor unit and an arrival predictor. The arrival predictor receives the calendar information from the mobile device for the guest of the hotel, predicts the hotel room arrival for the guest at the hotel room using the calendar information and performs the action in the hotel based on the hotel room arrival predicted for the guest. The computer program product comprises a computer-readable storage media with program code stored hereon. A first program code receives calendar information from the mobile device for the guest of the hotel while the guest is in the hotel. A second program code predicts the hotel room arrival for the guest at the hotel room using the calendar information. A third program code performs an action in the hotel based on the hotel room arrival predicted for the guest.

DETAILED DESCRIPTION

Figure 1:
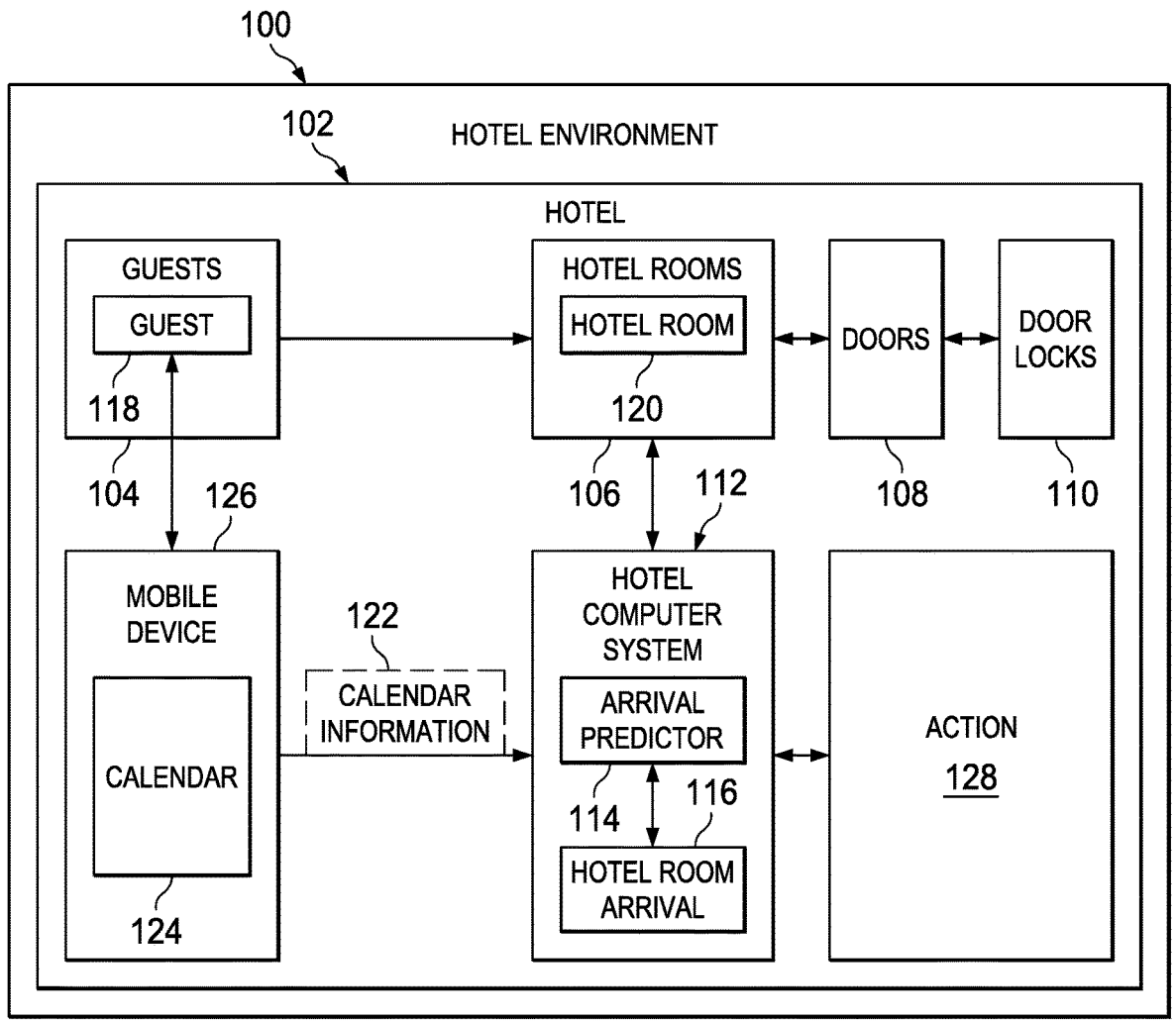
FIG. 1 is a block diagram of a hotel environment in accordance with an illustrative embodiment.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which a processed via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more instructions for implementing the specified logical function or functions. In some alternative implementations, the functions noted in the block or blocks may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take into account that it may be desirable to predict when a guest will return to the guest's hotel room. The illustrative embodiments recognize and take into account that current techniques for predicting when a guest will return to the room are not as accurate as desired to enable providing services to the guest in a desired manner.

The illustrative embodiments recognize and take into account that a calendar for a guest may provide information to enable a prediction of when the guest will return to the hotel room. Those embodiments also recognize and take into account that other information may be transmitted in addition to a token when unlocking a door in the hotel. For example, the illustrative embodiments recognize and take into account that calendar information for the guest may be sent in addition to the token. The calendar information may be analyzed to predict future times when the guest is likely to enter their hotel room. A prediction of when the guest is likely to enter their hotel room may be used to provide various services. For example, the embodiments recognize and take into account that with this information, housekeeping, maintenance, heating and cooling systems, and other hotel services may be controlled to optimize the experience of the guest.

The illustrative embodiments also recognize and take into account that in some situations, a guest may not have access to the Internet. For example, guests who are traveling internationally often do not have international roaming turned on their phones. As a result, cellular connections is often unavailable. As a further result, access to the Internet is unavailable or sporadic. The illustrative embodiments recognize and take into account that obtaining information to predict when a guest will return to the room may be more difficult than desired when access to the Internet is unavailable.

With reference now to the figures and, in particular, with reference to FIG. 1, a block diagram of a hotel environment is depicted in accordance with an illustrative embodiment. As depicted, hotel environment 100 includes hotel 102 in which guests 104 are present. Guests 104 may enter their hotel rooms 106 in hotel 102 in which hotel rooms 106 have doors 108 with door locks 110 controlled by hotel computer system 112.

In this illustrative example, hotel computer system 112 is designed to predict arrival for guests 104 in hotel 102 to hotel rooms 106. As depicted, hotel computer system 112 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

As depicted, arrival predictor 114 is a component in hotel computer system 112. Arrival predictor 114 predicts hotel room arrival 116 for guest 118 in guests 104 to hotel room 120 in hotel rooms 106. In this illustrative example, hotel room arrival 116 is a time at which guest 118 is predicted to arrive at hotel room 120 for guest 118. Hotel room 120 is the room in which guest 118 is staying in hotel 102.

In the illustrative example, arrival predictor 114 in hotel computer system 112 receives calendar information 122 for guest 118 from calendar 124 for guest 118 from mobile device 126 while guest 118 is in hotel 102. Mobile device 126 is a data processing system and may take various forms. For example, mobile device 126 may be selected from the group comprising a mobile phone, a tablet computer, a smart watch, or some other suitable type of mobile data processing system.

Arrival predictor 114 predicts hotel room arrival 116 for guest 118 at hotel room 120 using calendar information 122. Action 128 is performed in hotel 102 based on hotel room arrival 116 predicted for guest 118.

Action 128 may be performed by at least one of arrival predictor 114, another component in hotel computer system 112, personnel in hotel 102, or other suitable components or people needed to perform action 128. For example, action 128 may take the form of an instruction or request generated by arrival predictor 114 that is performed by the personnel in hotel 102.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations of items.

In the illustrative example, arrival predictor 114 may be implemented in software, hardware, firmware, or a combination thereof. When software is used, the operations performed by arrival predictor 114 may be implemented in program code configured to run on hardware, such as a processor unit. When firmware is used, the operations performed by arrival predictor 114 may be implemented in program code and data, and stored in a persistent memory to run on a processor unit. When hardware is employed, the hardware may include circuits that operate to perform the operations in arrival predictor 114.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem with predicting an arrival time for guest 118 at hotel room 120 for guest 118 in hotel 102. As a result, one or more technical solutions may provide a technical effect enabling predicting a time for hotel room arrival 116 for guest 118 more accurately to provide services to guests 104 in a desired manner. One or more technical solutions provide a technical effect of enabling this type of prediction by using calendar information 122 from calendar 124 for guest 118. Further, one or more technical solutions do not require the Internet using cellular or Wi-Fi communications.

Figure 2:
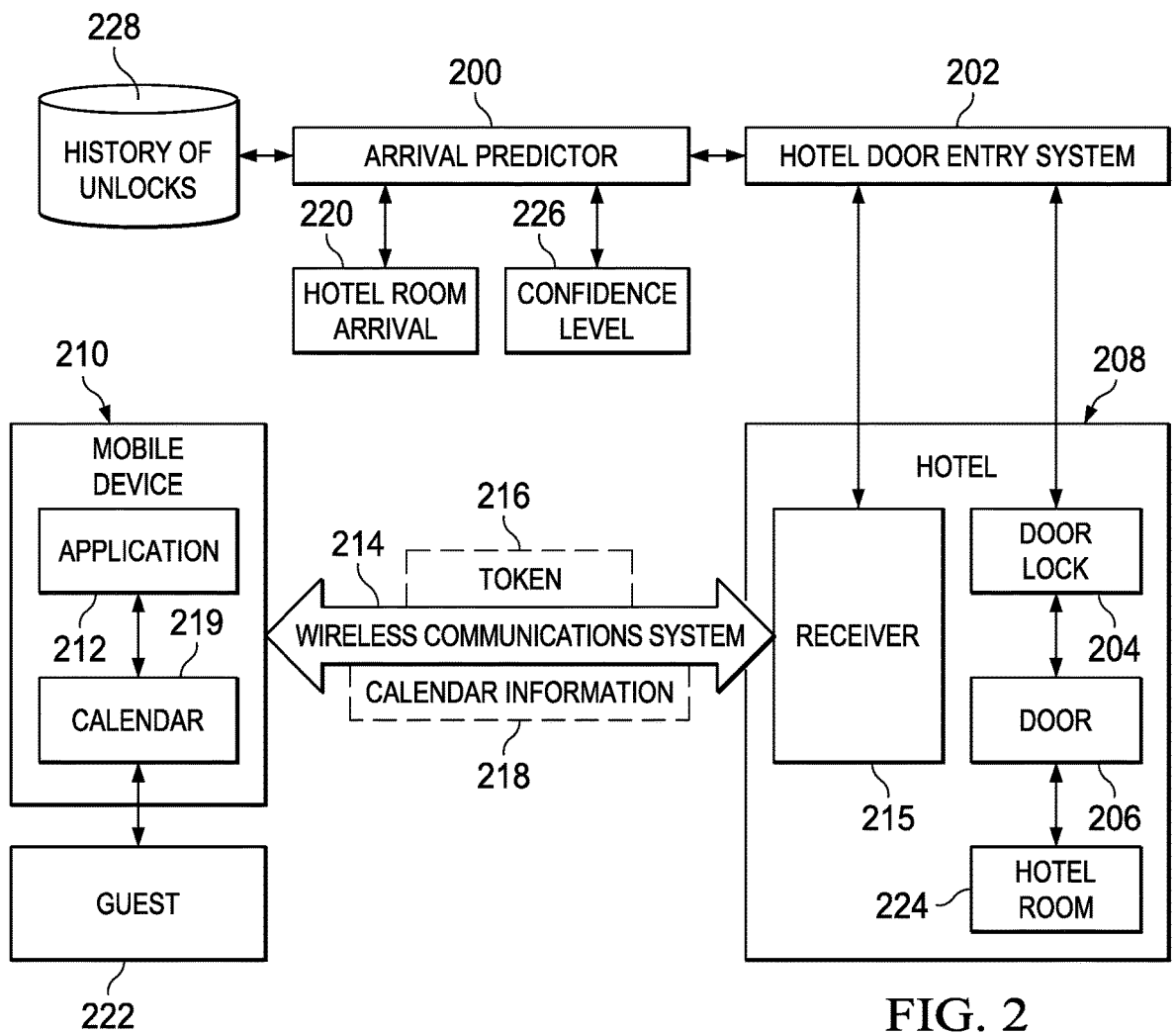
FIG. 2 is a block diagram of dataflow in predicting hotel room arrival for guest in accordance with an illustrative embodiment.

With reference next FIG. 2, a block diagram of dataflow for predicting hotel room arrival for guest is depicted in accordance with an illustrative embodiment. In this illustrative example, arrival predictor 200 is an example of arrival predictor 114 in FIG. 1. Arrival predictor 200 is in communication with hotel door entry system 202 which controls door lock 204 for door 206 in hotel 208. In this illustrative example, hotel door entry system 202 may be implemented in at least one of hardware or software in a computer system. Door 206 may be a door to a hotel room, a fitness center, a business center, a meeting room, or some other location in hotel 208.

As depicted, mobile device 210 establishes communication with hotel door entry system 202. In particular, application 212 running on mobile device 210 may communicate with hotel door entry system 202. As depicted, application 212 may be a mobile application designed specifically to run on mobile device 210.

The communication may be made using wireless communications system 214. Wireless communications system 214 may take a number of different forms. For example, wireless communications system 214 may be selected from at least one of near field communications, cellular communications, Wi-Fi communications, Bluetooth communications, infrared communications, magnetic communications, or some other suitable type of communications.

As depicted, a Wi-Fi network or cellular communication system is unnecessary when using near field communications for wireless communications system 214. The near field communications may be one already used in hotel door entry system 202 to control door lock 204 to unlock door 206, lock door 206, or some combination thereof. These communications may be made between mobile device 210 and receiver 215. Receiver 215 may be implemented within door lock 204 or in some other location. This location may be proximate to door 206. In this manner, additional infrastructure and a connection to the Internet are unnecessary. Near field communications (NFC) is a short-range connectivity standard that uses a magnetic field induction to enable communication between devices. The standard is Ecma-340, ISO/IEC 18092 in this illustrative example.

In this illustrative example, mobile device 210 sends token 216 to hotel door entry system 202 through receiver 215 for door lock 204. Token 216 is used to unlock door 206 in hotel 208. In this example, calendar information 218 is also sent with token 216 at the same time or substantially the same time as token 216. Hotel door entry system 202 unlocks door 206 in hotel 208 using token 216 in this example.

In this example, arrival predictor 200 receives calendar information 218 from mobile device 210 for guest 222 at hotel 208 as part of establishing communication between mobile device 210 and hotel door entry system 202. In this illustrative example, application 212 running on mobile device 210 accesses calendar 219 for mobile device 210 and sends calendar information 218 from calendar 219 to arrival predictor 200 in a hotel computer system via receiver 215.

Calendar information 218 may be used by arrival predictor 200 to predict hotel room arrival 220 for guest 222. In predicting hotel room arrival 220 for guest 222 using calendar information 218, arrival predictor 200 predicts hotel room arrival 220 for guest 222 at hotel room 224 using calendar information 218 and confidence level 226 for hotel room arrival 220. For example, more than one time for arriving in hotel room 224 may be predicted for guest 222. Each of these times may have confidence level 226 with different values. The time used for hotel room arrival 220 may be the time with the highest level of confidence.

In the illustrative example, arrival predictor 200 may predict hotel room arrival 220 for guest 222 using calendar information 218 and history of unlocks 228 for hotel room 224 by guest 222. In this illustrative example, history of unlocks 228 is a log of when door lock 204 in door 206 has been unlocked in hotel room 224. This history may include the date and time of when a lock occurred. History of unlocks 228 may be used to identify confidence level 226.

Figure 3:
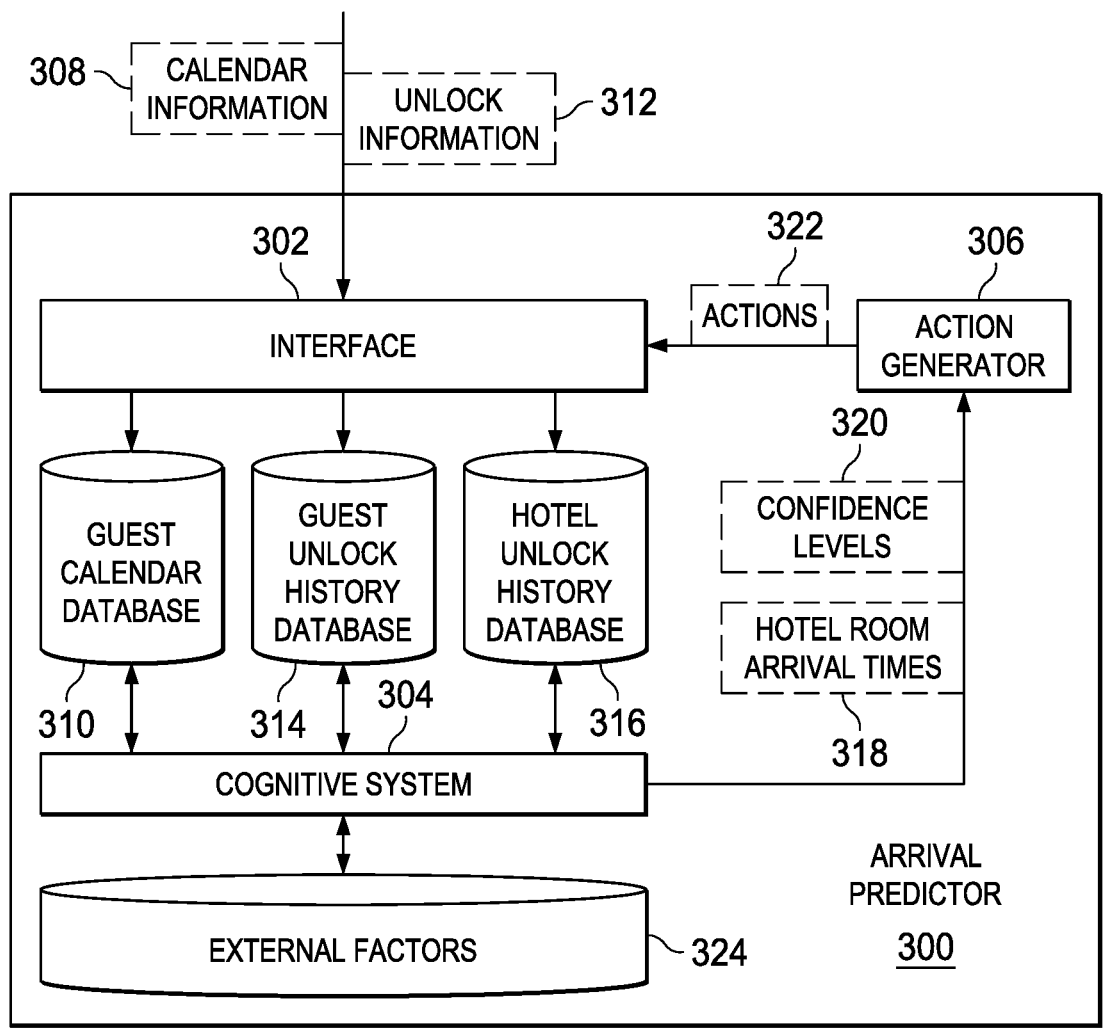
FIG. 3 is a block diagram of an example of an arrival predictor in accordance with an illustrative embodiment.

With reference next to FIG. 3, a block diagram of an example of an arrival predictor is depicted in accordance with an illustrative embodiment. In this illustrative example, arrival predictor 300 is an example of one implementation for arrival predictor 114 shown in FIG. 1.

As depicted, arrival predictor 300 comprises interface 302, cognitive system 304, and action generator 306. Interface 302 provides an interface to receive and send communications between at least one of the other components in hotel computer system 112 in FIG. 1 or hotel door entry system 202 in FIG. 2.

For example, interface 302 receives calendar information 308 for different guests and stores calendar information 308 and guest calendar database 310. Additionally, interface 302 also receives unlock information 312. Unlock information 312 is stored in guest unlock history database 314. Unlock information 312 is also stored in hotel unlock history database 316.

As depicted, guest unlock history database 314 stores the history of unlocks for each guest in the hotel. In this illustrative example, the history includes a date and time of each unlock for a guest. The database is updated with the current date and time of an unlock request each time the unlock request occurs. In other words, guest unlock history database 314 stores the history of unlocks on a per guest basis. Hotel unlock history database 316 stores an unlock request from any guest in the hotel. The information about the guests are anonymized in these examples and stores the date and time of the unlock request. The anonymization includes, for example, removing the names and room numbers. With this information, a pattern of unlocks for doors may be identified for the hotel as a whole.

As depicted, cognitive system 304 predicts hotel room arrival times 318 with confidence levels 320. In this illustrative example, cognitive system 304 uses natural language processing to extract a meaning from calendar appointments for a guest. For example, cognitive system 304 may use calendar information 308 to identify at least one of, which appointments are in person and which location will these appointments be held; which appointments are remote (such as conference calls) and could be conducted at any location; when is the guest likely to be finished for the day and return to the hotel; where the guest will be returning to the hotel from; or other suitable types of information for use in predicting one or more hotel room arrival times 318.

In addition to using calendar information 308 in guest calendar database 310, cognitive system 304 may also use information from other sources. For example, cognitive system 304 may access guest unlock history database 314 to identify the history of unlocks to the hotel room for the guest. Guest unlock history database 314 may be used to look for patterns of when a guest historically unlocks their door. This information may be collected from the current state of the guest, previous stays at the current hotel, previous stays at another hotel, or other sources of information.

With the information in guest unlock history database 314, inferences about the guest may be made such as: does the user typically return to their hotel room between 5:00 pm and 5:30 pm; is there one day of the week the user returns earlier or later than usual; what calendar appointments in the past have influenced when a user returns to the hotel and unlocks their door; what other locks in the hotel were activated that can be used to determine a modified return time; or other suitable inferences. In one illustrative example, a guest leaves a room and then 4 minutes later the hotel swimming pool door or hotel gym door is scanned. This pattern may be factored in the calculation for anticipated return to the hotel.

In the illustrative example, hotel unlock history database 316 is used to identify patterns that may be common to hotel guests, generally when they historically unlock the doors. For example, hotel unlock history database 316 may be used to identify inferences such as, most hotel guests do not return to a hotel room before 4 pm on weekdays; on public holidays 60 percent of hotel guests return to their room between 9:00 am and 4:00 pm; and other suitable inferences that may be identified based on patterns of unlocking doors in the hotel.

Further, other sources of information may be used by cognitive system 304 to predict hotel room arrival times 318. For example, external factors 324 may be used to identify factors beyond unlock times and calendar information to predict the future arrival time at which a guest will desire to unlock the door. For example, external factors 324 may include at least one of traffic data, weather data, events, or other suitable factors.

For example, traffic data may be analyzed to determine how long it will take a user to travel from their last known appointment in their calendar to the hotel. As another example, weather data may be used to identify situations, such as inclement weather, that may delay when a user arrives at a hotel. In yet another example, upcoming inclement weather may encourage the user to return to their hotel room earlier than usual. Further, events may be used to determine influences on when a user returns to the hotel. For example, a Manager's Reception at the hotel at 5:00 pm may encourage the user of the hotel room to return earlier.

Hotel room arrival times 318 and confidence levels 320 are sent to action generator 306 to perform actions 322. Actions 322 may take a number of different forms. For example, housekeeping can be notified when a user is likely to return to their room, and can therefore prioritize the order of rooms to be cleaned to ensure all rooms are finished before their occupants return. The same applies to performing maintenance before a guest returns. Additionally, hotel rooms need not be heated or cooled when there is a low probability of a hotel room being occupied.

Also, the hotel locking system can be configured to become more responsive upon a guest's return. Many digital keys work on a Bluetooth polling cycle of 10 or more seconds. This polling window means a potentially poor guest experience may occur from the guest waiting for the door lock to discover that guest is present. With cognitive system 304 and action generator 306, the door lock for a hotel room can be configured to move to a 1 second polling cycle during the predictive window established. In this manner, the guest is provided with a much better experience, without significantly impacting the battery life or operation of the default lock's polling cycle.

The illustration of hotel environment 100 in FIG. 1, the components illustrating the data flow shown in FIG. 2, and the illustration of an example of implementation for an arrival predictor in FIG. 3 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment For example, receiver 215 may be in other locations other than in door lock 204. Receiver 215 may be deployed in other locations around the hotel. For example, a user may use a digital hotel key application to gain entrance to the hotel lobby or parking structure. This use presents another opportunity to collect hotel arrival information from a user. This data collection indicates a hotel user is entering the hotel premises and on their way to their hotel room. This information can be used to update predictions of when a user is likely to unlock their door, and subsequently update actions based on that. For example, a user uses their mobile application to enter the hotel parking structure earlier than predicted. Action can be taken, such as turning on the air conditioning in the user's room, before guest arrives at the room.

As another example, a transmitter may be used with receiver 215 in FIG. 2 to send information to mobile device 210. In other illustrative examples, a transceiver may be used in place of receiver 215.

Figure 4:
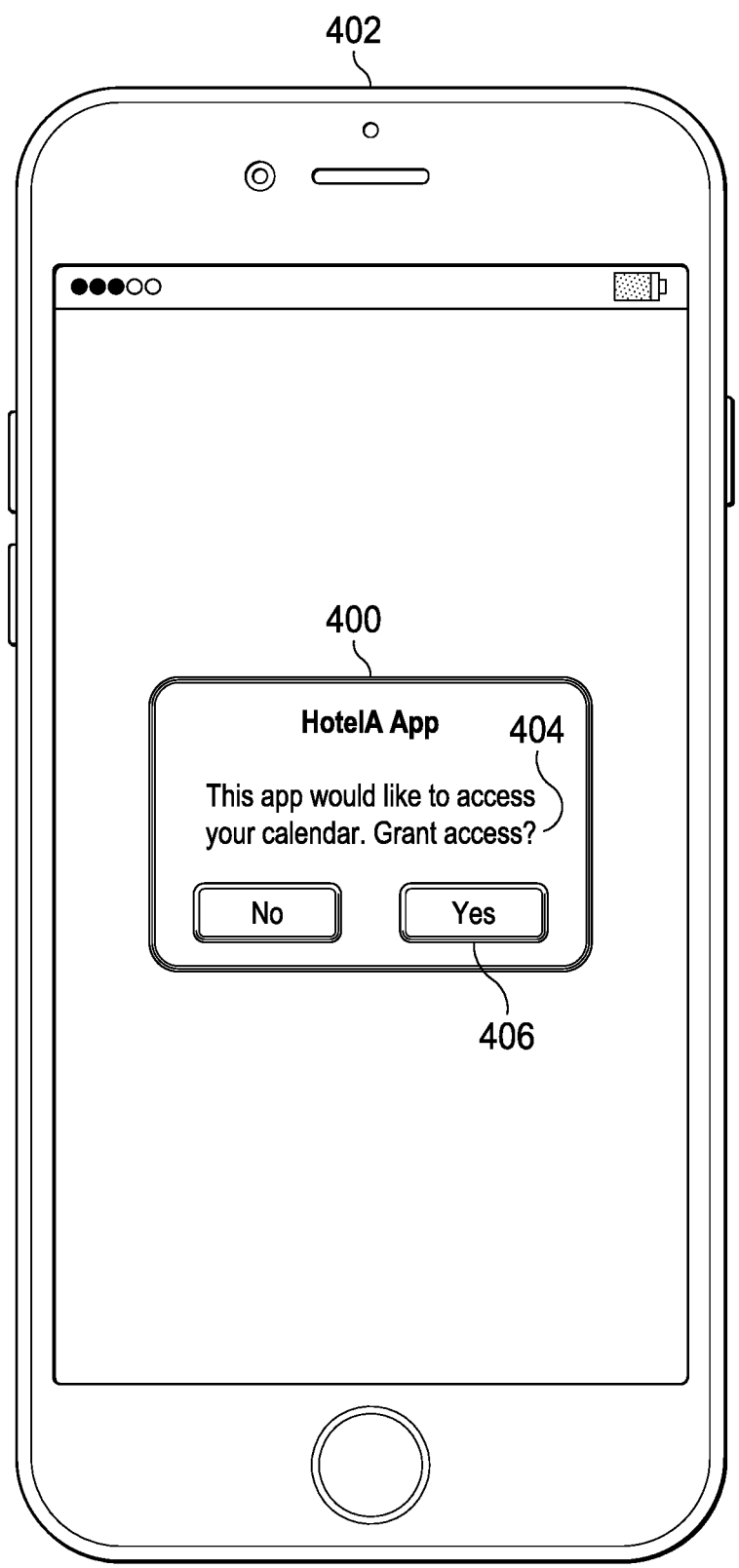
FIG. 4 is an illustration of accessing calendar information in accordance with illustrative embodiment.
Figure 5:
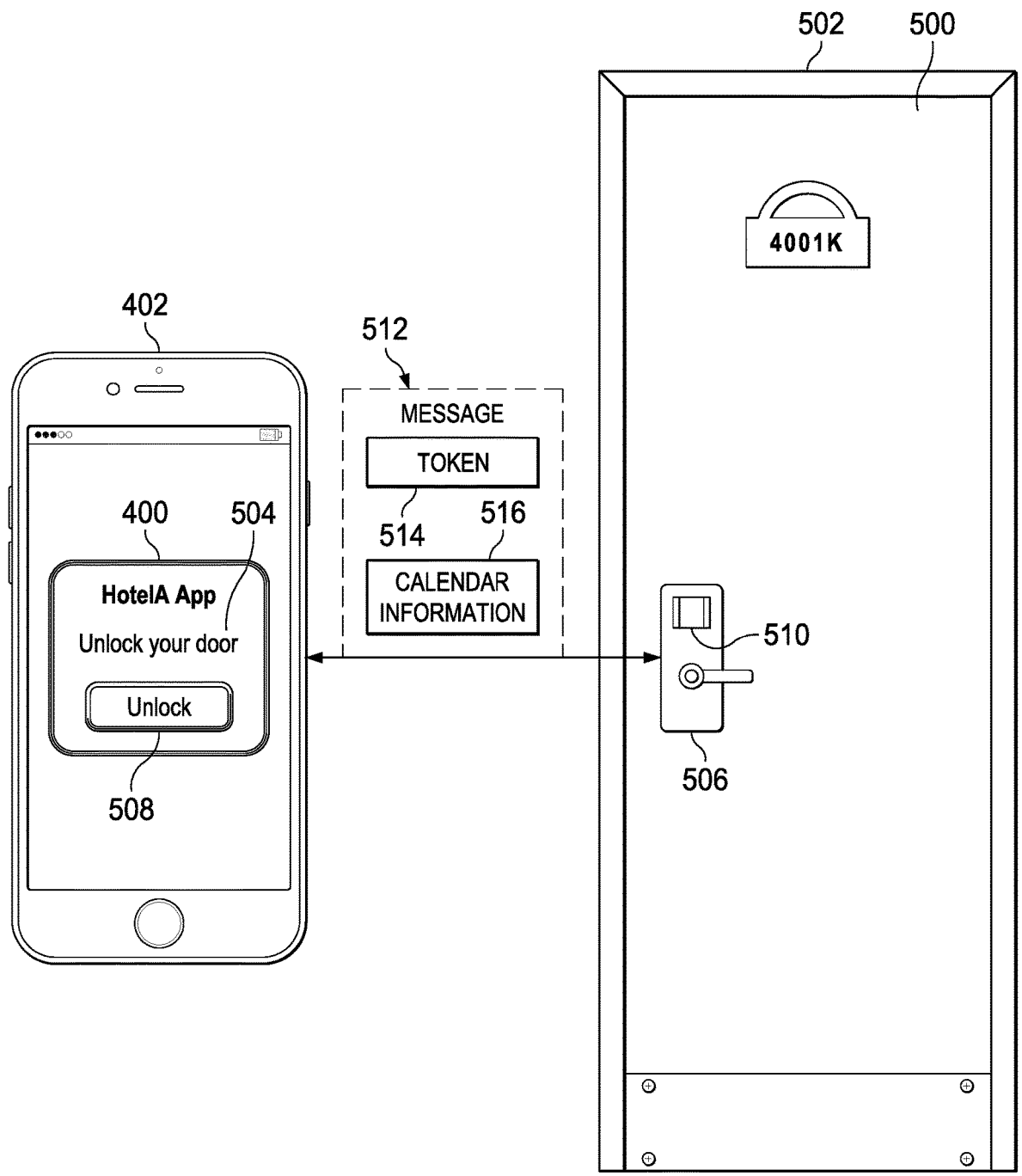
FIG. 5 is an illustration of unlocking a door in accordance with an illustrative embodiment.

With reference to FIG. 4 and FIG. 5, illustrations of a process for predicting an arrival time of a guest at a hotel room are depicted in accordance with an illustrative embodiment. With reference first to FIG. 4, an illustration of accessing calendar information is depicted in accordance with illustrative embodiment. In this illustrative example, mobile application 400 is running on mobile device 402. As depicted, mobile application 400 is configured to allow a guest to unlock a door to a hotel room. Mobile application 400 may be, for example, a digital hotel key mobile application.

As depicted, mobile application 400 displays screen 404 requesting access to the calendar on mobile device 402. If permission is granted by selecting yes button 406, then mobile application 400 has permission to obtain calendar information from the calendar for the guest and send calendar information when unlocking the door in the hotel. In this example, the calendar information is a subset of the calendar. The calendar information may be used to indicate activities that the guest will undertake during their stay at the hotel. Although illustrated as part of a door unlocking process, the calendar information may be sent at other times other than during the unlocking of the door.

Turning next to FIG. 5, an illustration of unlocking a door is depicted in accordance with an illustrative embodiment. In this illustrative example, mobile device 402 is located proximate to door 500 for hotel room 502. As depicted, mobile application 400 displays screen 504 asking whether to unlock door lock 506 in door 500. If the guest selects unlock button 508, mobile device 402 communicates with receiver 510 for door lock 506. In this particular example, receiver 510 is integrated as part of door lock 506. In other illustrative examples, receiver 510 maybe a separate component located near door lock 506. This communication involves mobile application 400 sending message 512 to receiver 510. Message 512 includes token 514 and calendar information 516.

Figure 6:
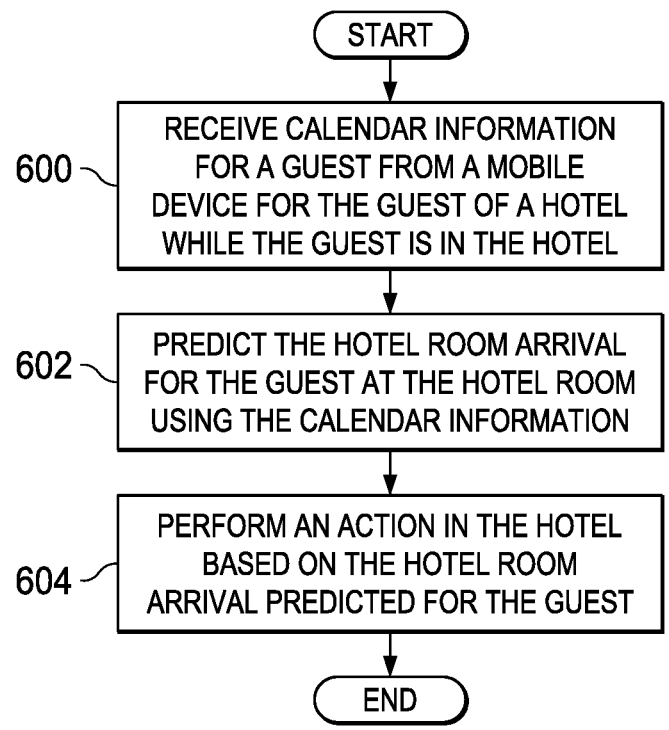
FIG. 6 is a flowchart of a process for predicting a hotel room arrival in accordance with an illustrative embodiment.

With reference next to FIG. 6, a flowchart of a process for predicting a hotel room arrival is depicted in accordance with an illustrative embodiment. The process illustrated in FIG. 6 may be implemented in at least one of software or hardware in arrival predictor 114 in hotel computer system 112 in FIG. 1.

The process begins by receiving calendar information for a guest from a mobile device for the guest of a hotel while the guest is in the hotel (step 600). The process predicts the hotel room arrival for the guest at the hotel room using the calendar information (step 602). The process performs an action in the hotel based on the hotel room arrival predicted for the guest (step 604). The process terminates thereafter.

The action performed in step 604 may take a number of different forms. For example, the action may comprise performing a group of hotel services in the hotel based on the hotel room arrival time predicted for the guest. For example, the group of hotel services may be selected from at least one of a room cleaning, room maintenance, a room temperature adjustment, or some other type of service.

In another illustrative example, the action may comprise increasing a polling frequency for receiving a token to unlock a door. In other words, the frequency at which the door lock is active and ready to receive the token may occur more frequently during a time at which the guest is predicted to arrive. For example, the door lock may become active to listen for a mobile device for 10 seconds and then turn off for 10 seconds. The wait time may be annoying to the guest. As result, the polling may be changed from 10 seconds to 1 second to reduce the amount of time that the guest may have to wait for the door to become unlocked.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
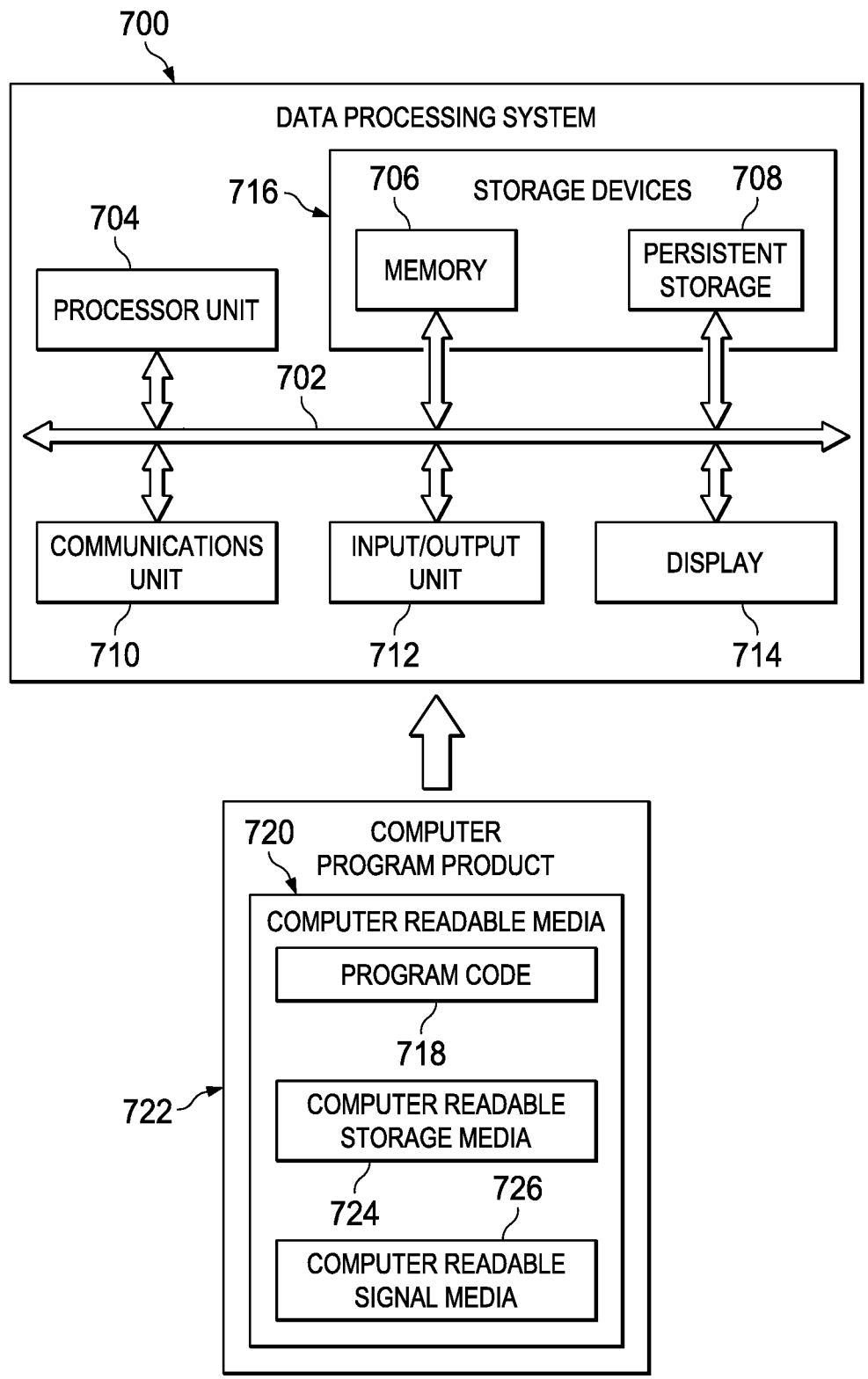
FIG. 7 is a block diagram of a data processing system in accordance with an illustrative embodiment.

Turning now to FIG. 7, a block diagram of a data processing system is depicted in accordance with an illustrative embodiment. Data processing system 700 may be used to implement hotel computer system 112 in FIG. 1, mobile device 126 in FIG. 1, arrival predictor 200 in FIG. 2, hotel door entry system 202 in FIG. 2, mobile device 210 in FIG. 2, arrival predictor 300 in FIG. 3, and mobile device 402 in FIG. 4. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to process instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable types of information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a solid state hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and run by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

Thus, illustrative embodiments of the present invention provide a computer implemented method, computer system, and computer program product for predicting a hotel room arrival. In one illustrative example, a hotel computer system receives calendar information for a guest from a mobile device for a guest of a hotel while the guest is in the hotel. The hotel computer system predicts the hotel room arrival for the guest at the hotel room using the calendar information. An action is performed in the hotel based on the hotel room arrival predicted for the guest. This action may be performed by the hotel room computer system. Action may be to initiate a service or other action to be performed by personnel in the hotel.

In the illustrative example, the hotel computer system combines the exchange of calendar information from a guest's mobile device during the hotel keyless entry handshake, for processing by a cognitive system. No Internet connectivity is required for a mobile device to communicate calendar information to a hotel computer system. The cognitive system in the hotel computer system predicts which times in the future a guest is likely to return to their hotel room, based on the guest's calendar information transmitted during keyless entry. This prediction also may be based on the guest's prior unlock history, aggregate hotel unlock history, and external factors such as weather and traffic. In this manner, a prediction of when a guest will arrive at a hotel room may be made using calendar information for the guest.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more instructions for implementing the specified logical function or functions. It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for predicting a hotel room arrival, the method comprising:
a hotel computer system implementing an arrival predictor, the arrival predictor comprising a cognitive system, an action generator, a guest unlock history database, and a hotel unlock history database different than the guest unlock history database, the arrival predictor:
receiving calendar information for a guest from a mobile device for the guest of a hotel, wherein the calendar information is received while the guest is in the hotel;
predicting the hotel room arrival for the guest using the calendar information, wherein the hotel room arrival is for arrival of the guest at a hotel room of the hotel, wherein:
the cognitive system is in communication with the guest unlock history database, the hotel unlock history database, and the action generator; and
the cognitive system is configured to predict the hotel room arrival for the guest using the calendar information, the guest unlock history database, and the hotel unlock history database; and
responsive to predicting the hotel room arrival, performing an action in the hotel based on the hotel room arrival predicted for the guest, wherein the action is performed by the action generator;
wherein:
the cognitive system uses the guest unlock history database to look for patterns of when the guest has historically unlocked their door;
the arrival predictor is in communication with a hotel door entry system;
the hotel door entry system controls locking and unlocking of the hotel room;
the mobile device establishes communication with the hotel door entry system;
the hotel door entry system uses near field communication to communicate with the mobile device; and
locking or unlocking of the hotel room is more responsive based on predicted hotel room arrival using the calendar information, the guest unlock history database, and the hotel unlock history database.

2. The method of claim 1, wherein receiving the calendar information from the mobile device for the guest at the hotel comprises:
receiving the calendar information from the mobile device for the guest at the hotel as part of establishing communication between the mobile device and a hotel door entry system.

3. The method of claim 1, wherein predicting the hotel room arrival for the guest at the hotel room using the calendar information comprises:
predicting the hotel room arrival for the guest at the hotel room using the calendar information and a confidence level for the hotel room arrival.

4. The method of claim 1, wherein predicting the hotel room arrival for the guest at the hotel room using the calendar information comprises:
predicting the hotel room arrival for the guest at the hotel room using the calendar information and a history of unlocks for the hotel room by the guest.

5. The method of claim 1 further comprising:
the arrival predictor receiving a token used to unlock a door in the hotel with the calendar information; and
the action generator unlocking the door in the hotel using the token.

6. The method of claim 1, wherein performing the action in the hotel based on the hotel room arrival predicted for the guest comprises:
initiating performance of a group of hotel services in the hotel based on the hotel room arrival predicted for the guest.

7. The method of claim 6, wherein the group of hotel services is selected from at least one of room cleaning, room maintenance, or room temperature adjustment.

8. The method of claim 1, wherein a mobile application running on the mobile device accesses a calendar for the mobile device and sends the calendar information to the hotel computer system.

9. The method of claim 1, wherein the hotel room arrival is for the guest returning to the hotel room after having left the hotel room.

10. The method of claim 1, wherein the action includes prioritizing an order of hotel rooms for at least one of cleaning or maintenance based on a probability of a hotel room being occupied.

11. The method of claim 1, wherein the action includes:
heating or cooling a hotel room; or
automatically locking or unlocking the hotel room.

12. A hotel computer system for predicting a hotel room arrival, the hotel computer system comprising:
a processor unit of the hotel computer system implementing an arrival predictor, wherein:
an interface of the arrival predictor receives calendar information from a mobile device for a guest of a hotel, the calendar information received while the guest is in the hotel;
a cognitive system of the arrival predictor predicts the hotel room arrival using the calendar information, wherein the hotel room arrival is for arrival of the guest at a hotel room; and an action generator of the arrival predictor performs an action in the hotel based on the hotel room arrival predicted for the guest, wherein:
the action generator is different than the cognitive system;
the action generator is different than the interface; and
the interface is different than the cognitive system; wherein:
the cognitive system uses the guest unlock history database to look for patterns of when the guest has historically unlocked their door;
the arrival predictor is in communication with a hotel door entry system;
the hotel door entry system controls locking and unlocking of the hotel room;
the mobile device establishes communication with the hotel door entry system; and
locking or unlocking of the hotel room is more responsive based on predicted hotel room arrival using the calendar information.

13. The hotel computer system of claim 12, wherein in receiving the calendar information from the mobile device for the guest at the hotel, the arrival predictor receives the calendar information from the mobile device for the guest at the hotel as part of establishing communication between the mobile device and a hotel door entry system.

14. The hotel computer system of claim 12, wherein in predicting the hotel room arrival for the guest at the hotel room using the calendar information, the arrival predictor predicts the hotel room arrival for the guest at the hotel room using the calendar information and a confidence level for the hotel room arrival.

15. The hotel computer system of claim 12, wherein in predicting the hotel room arrival for the guest at the hotel room using the calendar information, the arrival predictor predicts the hotel room arrival for the guest at the hotel room using the calendar information and a history of unlocks for the hotel room by the guest.

16. The hotel computer system of claim 12, wherein the arrival predictor receives a token used to unlock a door in the hotel with the calendar information and unlocks the door in the hotel using the token.

17. The hotel computer system of claim 12, wherein in performing the action in the hotel based on the hotel room arrival predicted for the guest, the arrival predictor performs a group of hotel services in the hotel based on the hotel room arrival predicted for the guest.

18. The hotel computer system of claim 17, wherein the group of hotel services is selected from at least one of a room cleaning, a room maintenance, or a room temperature adjustment.

19. The hotel computer system of claim 12, wherein the action comprises increasing a polling frequency for receiving a token to unlock a door.

20. The hotel computer system of claim 12, wherein a mobile application running on the mobile device accesses a calendar for the mobile device and sends the calendar information to the hotel computer system.

* * * * *